Aug. 16, 1932.  R. A. KOPP  1,872,465
SCALE BEAM
Filed Aug. 24, 1929
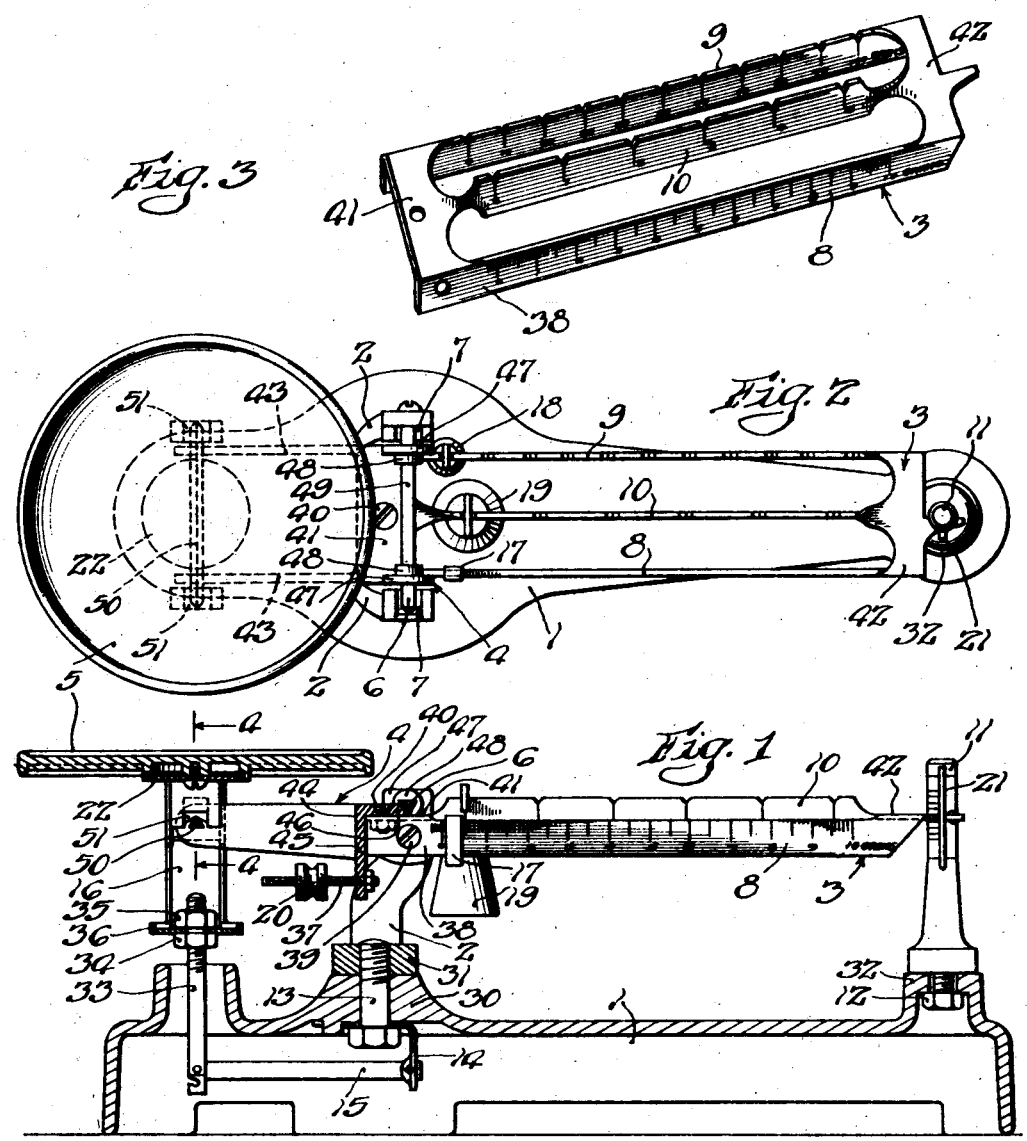
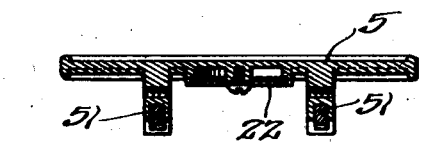
Inventor:
Reinhold A. Kopp Patented Aug. 16, 1932

1,872,465

UNITED STATES PATENT OFFICE

REINHOLD A. KOPP, OF CHICAGO, ILLINOIS, ASSIGNOR TO W. M. WELCH MFG. CO., OF CHICAGO, ILLINOIS, A CORPORATION OF ILLINOIS

SCALE BEAM

Application filed April 24, 1929. Serial No. 357,682.

The present invention relates to scale beams, and it has to do particularly with a a scale beam intended for use upon multiple beam scales.

Heretofore it has been common to provide in a multiple beam scale a plurality of individual scale members which are formed or manufactured separately and thereafter assembled one with another, there being common connecting or transverse members at each end.

The present invention has an object in view of forming such a plurality of scales in a single unit wherein the said scales will always be a fixed and predetermined relation.

An added object of the invention is to provide an improved method of producing a triple beam scale, in which the scales may be formed at a single operation, and wherein such scales will always maintain a fixed and predetermined relationship.

These objects and such other objects as may hereinafter appear, are obtained by the novel construction, unique arrangement, and improved combination of the several elements which are employed in the manufacture of the invention, one form only of which is illustrated in the accompanying drawing in which Figure 1 is an elevation of a scale employing the invention, there being a part of such scale in section;

Figure 2 is a top view of the scale shown in Figure 1;

Figure 3 is a perspective view of the scale member forming the subject matter of the present invention; and Figure 4 is a transverse section on the lines 4—4 of Figure 1 of the scale pan showing its construction and the arrangement of the agate bearings thereon.

Like reference characters are used to designate similar parts in the drawing and in the description of the invention which follows:

In the illustration of the present form of the invention, the base of the scale, usually of an inverted dish type and cast, and by any conventional configuration, is designated 1. Lugs project downwardly therefrom at opposite ends to provide feet upon which the scale is supported.

Upon a suitable boss 30 upon the upper side of the base 1 is a center knife edge rest 2, which projects upwardly as a standard to support the scale 3. Said rest 2 has enlarged collar or bottom section 31 which impinges the top of boss 30.

The screw for holding the scale support 2 upon the base 1 is designated 13, and said screw extends through boss 30 and collar 31.

Upon a suitable boss 32 upon the base 1 is an indicator 11 which may be die cast, and which is secured to said boss by a screw 12. A guide rod 21 is provided for the indicator 11 at the end of the scale 3.

Within the dished portion of the base 1 is a specimen hanger 33 and connecting rod 15, a bracket 14 for the latter being attached about the shank of screw 13. To the specimen hanger is secured a bracket 16 for the scale plate, there being the usual connection between the specimen hanger and said bracket comprising a threaded end upon which are disposed two nuts 34 and 35, one being adapted to engage the under surface of transverse member 36 upon the bracket 16, and the other, the upper surface thereof.

At one end and secured to the scales in a manner hereinafter referred to, is mounted a die casting 4 which supports scale beam 3. Parts 3 and 4 when combined form what is called the beam of a triple-beam balance.

A scale pan comprising a bakelite plate 5, is adapted to rest upon steel knife edges 50 disposed at the other end of said scale beam die casting 4. In the depending portions of said bakelite plate 5 are agate bearings 51. Such scale pan, best illustrated in Figure 4, is the subject matter of a separate application for letters patent, filed concurrently with the instant application. There is therein a lead shot container and a cover plate 22 therefor, the container being on the under part of pan 5. The scale beam 3 at the other end of said die casting is the item upon which this application for Letters Patent is primarily predicated.

The pronounced novelty of the present invention is the provision of a triple scale beam in which the material of the three scales is unitary. This permits of a single etching upon each side of the blank material, making two etchings to supply the three scale beams. In the present structure, there are 10, 100, and 500 gram scales.

The 10-gram scale is designated 8, the 100-gram scale 9, and the 500-gram scale 10. (See Figure 3.)

The sliding weights for the several scales comprise the weight 17 for the 10-gram scale, the weight 18 for the 100-gram scale, and the weight 19 for the 500-gram scale.

From a flat blank or plate, there is stamped out two elongated strips having enlarged heads leaving in the blank the portions of material for forming the center scale, the outer scales, the transverse end sections and the pointer. The center of the blank forms the central scale, and the material forming the outer scales is at the edges thereof. The blank so stamped is then folded downwardly at its sides so that the two outside scales 8 and 9 are parallel and have their top edges in the same horizontal plane. The intermediate material is twisted 90 degrees and this provides the third scale 10 intermediate the other two scales 8 and 9. The center scale 10 is somewhat elevated above the edge scales 8 and 9.

The center and far scales 9 and 10 are provided with notches at spaced intervals to receive a depending weight (18 and 19) which is adapted, when properly positioned, to rest in one of the notches referred to.

The nearmost scale 8 is adapted to receive a sliding weight 17, one edge of which is adapted to be read against the divisions and subdivisions appearing upon scale 8.

From said blank, there is adapted to project an end piece 38 and at its inner end, three perforations are drilled therethrough.

By means of these three perforations, the scale is adapted to be attached to the support 4, there being bolts and nuts 39 at the side of the scale 3 and a machine screw 40 through the top, all of these members being seated in apertures provided therefor in the die cast support 4. The transverse section of the scales receiving said screw and bolts is designated 41.

Across the outer end of the scale beam is a horizontal section 42, the inner end 41 being adapted to rest against the under surface of the end of the support 4.

Said support 4 comprises two projecting end members 43, a transverse or bridge portion 44, said bridge portion comprising a vertically disposed transverse member having a dependent V-shaped projection 45 to receive threaded shank 37 and a horizontal section 46, through which latter section the machine screw 40 is adapted to pass, said screw also passing through the transverse section 41 of the scale portion.

Upon said threaded shank 37, there is disposed the counter weight 20 which is usual in its structure and comprises a knurled member adapted to be moved horizontally along said threaded shank having an axis parallel to the scales 3.

At its outermost end, said support has two bosses 47 at which point the material is thickened, the thickened portion being marked 48. Through the projecting and internal bosses 47 and 48 a triangular member 49 is projected. The ends of this member comprise the knife edges of the scale, these being designated 6 and being adapted to ride upon the agate blocks 7 seated within the furcations in the standard 2.

At its opposite end, a similar knife edge member 50 is projected through the two side members 43 which also have bosses, the knife edge being at the opposite sides of member 43 and being adapted to ride in agate blocks 51 disposed in the ears depending from the pan 5.

I claim:

1. In scale structure, a beam comprising a unitary sheet of material providing a plurality of scales the top edges of which are in substantially the same horizontal plane.

2. A scale beam comprising a blank having slits therein, the material thereof providing a plurality of scales the top edges of which are in substantially the same horizontal plane.

3. In scale structure, a unitary beam comprising a blank of sheet material having slits therein and being bent to provide a plurality of parallel scales the top edges of which are in substantially the same horizontal plane.

4. In scale structure, a beam comprising a blank having slits, the material of the blank providing a plurality of scales the top edges of which are in different horizontal planes.

5. A scale beam including a plurality of scales, and comprising a sheet of material having a projection extending therefrom to provide a pointer, the remainder of the material thereof having slits therein and providing a series of scales separate one from another and having the top edges thereof in substantially the same horizontal plane.

6. A scale beam comprising a blank having strips of material removed therefrom, the remainder of the material providing a plurality of scales having their top edges in horizontal alignment but not in the same horizontal plane.

7. In scale structure, a unitary beam comprising a blank of sheet material having apertures cut therein, the material being folded to provide a plurality of vertically parallel scales having a horizontal connecting section therebetween.

8. In scale structure, a beam comprising a rectangular blank, there being longitudinal slits in said blank, the material of said blank providing a plurality of scales having horizontal connecting sections therebetween.

9. A blank for the formation of a plurality of parallel vertical scales, comprising a rectangular sheet of material having a projection therefrom to provide a pointer, the remainder of the material providing scales separated one from another by horizontal plane sections of material.

REINHOLD A. KOPP.